Figure 1:
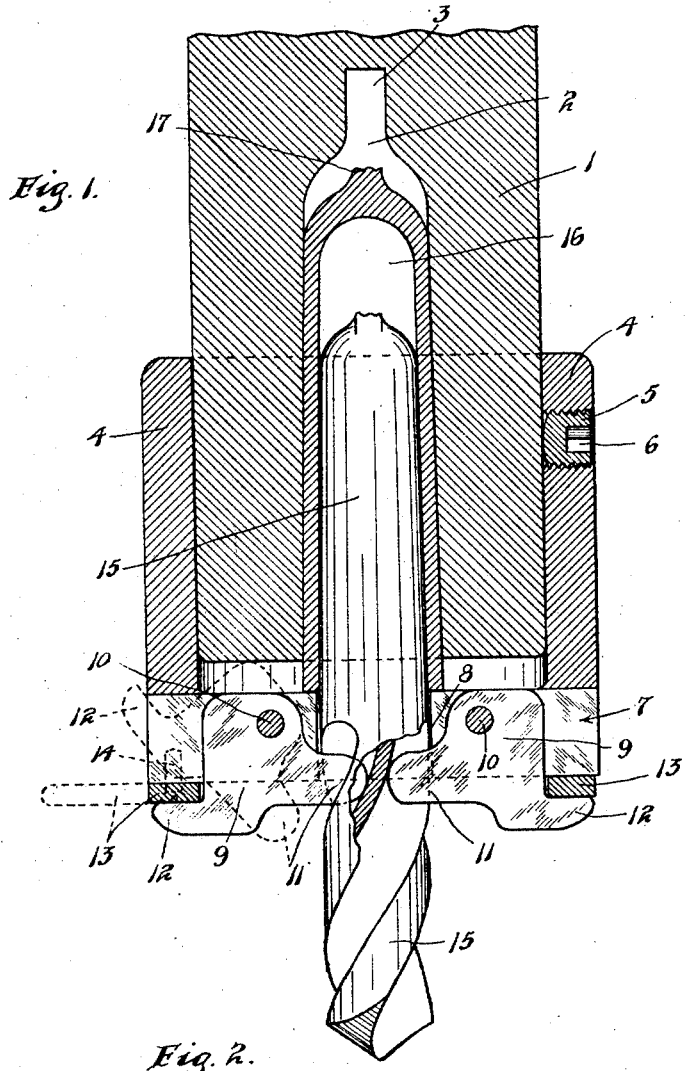

F. C. SHORE.
DRILL CHUCK.
APPLICATION FILED OCT. 13, 1920.

1,415,720.

Patented May 9, 1922.

INVENTOR.
FRANK C. SHORE.
BY HIS ATTORNEY
James F. Williamson

UNITED STATES PATENT OFFICE.

FRANK C. SHORE, OF MINNEAPOLIS, MINNESOTA, ASSIGNOR OF ONE-HALF TO GEORGE B. ARONES, OF MINNEAPOLIS, MINNESOTA.

DRILL CHUCK.

1,415,720.   Specification of Letters Patent.   Patented May 9, 1922.

Application filed October 13, 1920. Serial No. 416,611.

*To all whom it may concern:*

Be it known that I, FRANK C. SHORE, a citizen of the United States, residing at Minneapolis, in the county of Hennepin and State of Minnesota, have invented certain new and useful Improvements in Drill Chucks; and I do hereby declare the following to be a full, clear, and exact description of the invention, such as will enable others skilled in the art to which it appertains to make and use the same.

This invention relates to drill chucks adapted to be carried by the drilling arbor of a drilling machine.

It is an object of the invention to provide a simple chuck in which drills which have had the tang at the end thereof broken off, may be readily inserted and driven thereby.

It is a further object of the invention to provide a chuck in which the usual drills may be quickly inserted and positioned in driving relation to the arbor of the drilling machine.

Further objects of the invention will become apparent as the description proceeds in connection with the accompanying drawing, in which like reference characters refer to the same parts throughout the different views, and in which—

Figure 2:
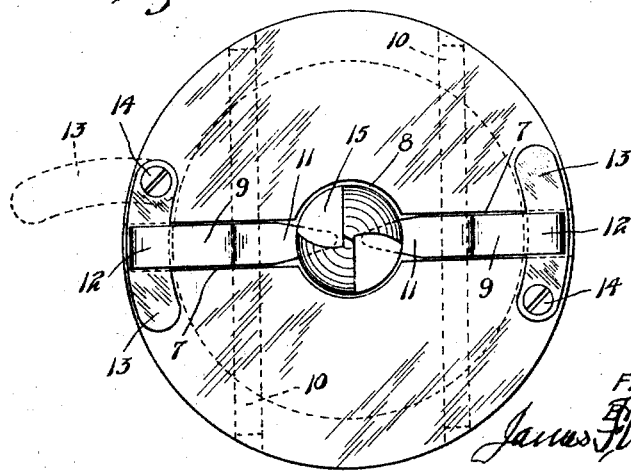

Fig. 1 is a central vertical section of the device showing a drill held therein; and Fig. 2 is a bottom plan view of Fig. 1.

Referring to the drawings, the numeral 1 represents a cylindrical arbor or drilling post of a drilling machine or drill press having the usual tapered socket 2 formed centrally therein and which has at its upper end the usual flat socket portion 3 which is adapted to receive a flat tang formed on the end of a drill or drill socket.

The chuck proper comprises a cylindrical sleeve 4 which fits slidably upon the member 1 and is adapted to be held thereon by a set screw 5 which can be tightened by the application of a suitable wrench to the socket 6 shown therein. The lower end of the member 4 has a slot 7 extending thereacross and a circular opening 8 is formed centrally of the lower end of this member 4. Except for the openings 7 and 8, the member 4 is closed at the lower end, the said end having a flat surface, as shown in Fig. 2. Disposed on each side of the opening 8, in the slot 7 is a pivoted member 9 mounted to swing in a vertical plane upon pivots 10, as shown in dotted lines in Fig. 1. Each of these members 9 has a tongue 11 projecting toward the center of the chuck, which tongue is tapered in a horizontal section, as shown in Fig. 2. Extending outwardly from the body of the members 9 is a tail piece or lug 12. The lugs 12 extend below and are spaced from the lower surface of the chuck to provide a space in which members 13 are arranged to be swung. The members 13 comprise small arcuate plates or wing members and are pivoted to the lower end of the chuck by pivot screws 14. A drill 15 having the driving tang broken therefrom is shown in place in the chuck. This drill is shown as disposed in a drill socket 16, which also has the driving tang broken therefrom, the broken portion of the tang being shown at 17.

As previously stated, the chuck can be used with any ordinary drill and it can also be used to drive a drill having the driving tang broken therefrom. In operation, the wings 13 will be swung outwardly, as indicated in dotted lines in Fig. 2 and the pivoted members 9 will then be lifted into the position shown by dotted lines in Fig. 1. The drill can then be inserted in the socket in the arbor. The members 9 then drop so that the tongues 11 will enter the helical grooves formed in the drill. These lugs will drop until the ends of the tongues thereof contact with the sides of the drill at the bottom of the grooves, as shown in Fig. 1. The wings 13 will then be swung in to hold the lugs 9 in this position. The drill is now held in driving position, the chuck being held up on the arbor by a set screw 5. When the arbor turns, the drill will be driven by a contact of lugs 9 with the sides of the grooves therein, and a driving tang at the top of the drill will not be needed.

As shown in Fig. 1, the drill socket with the tang broken therefrom can be used to reduce the opening in the arbor and a drill placed therein to be driven by the chuck.

It will also be noted that by turning the chuck in the direction in which the drill is to be driven, the groove in the drill and the tongues 11 will act as a thread and nut and the shank of the drill will be forced upwardly to a firm position.

When using the chuck with drills having the tangs thereon, the shank of the drill will be placed in the tapered opening in the arbor or in the opening of a drill socket placed in the arbor. The lugs 9 will be lifted to engage the grooves in the drill and the member 4 turned in the direction in which the drill is to be driven. The drill will then be forced into firm contact in the shank socket and the set screw 5 will then be tightened to hold the chuck in position.

It will also be noted, that by loosening the set screw 5 the sleeve 4 can be lowered on the drill to form a firm driving means near the lower end thereof. This is advantageous when drilling through thin mateial.

Attention is called to the fact that the chuck can be used with straight shank drills, as well as those having a tapered shank. The chuck can also be used with all sizes or drills and the lugs 9 will be lifted to contact with the central rib of the drill lying between the grooves therein, no matter what size of drill is used.

From the above description, it will be seen that applicant has produced a drill chuck of great adaptability and utility. The chuck is, furthermore, of simple construction and contains no parts which are complicated or liable to get out of order.

It will, of course, be understood that the particular form of lugs 9 may be varied, as well as the forms of the other parts of the device without departing from the spirit of the invention.

Generally stated, the invention consists in the matter shown and described and set forth in the appended claims.

What is claimed is:

1. A drill chuck having in combination a cylindrical member adapted to be adjustably mounted on the arbor of a drill press, oppositely disposed pivoted lugs carried by the lower end of said member and adapted to swing in a vertical plane, projections on said lugs for engaging in opposite grooves of the drill and pivoted swinging wing members carried by the lower end of said member adapted to hold said lugs in engaging position.

2. A drill chuck comprising a vertically disposed cylindrical sleeve having a substanstantially closed lower end, said end having a central opening therein and having slots at opposite sides thereof extending entirely across said end, vertically swinging lugs in said slots, a transverse pivot for each lug, said lugs having tapered projections thereon extending into said central opening to engage the grooves in a drill, and also having outwardly extending projections disposed below the end of the sleeve, and horizontally swinging members pivoted in the lower end of the sleeve movable into engagement with the last mentioned projections to hold the lugs in drill-engaging position.

3. A drill chuck for holding and driving a twist drill having in combination a cylindrical sleeve fitting and slidable on the arbor of a drill press, means for connecting said sleeve to said arbor, said sleeve having a cylindrical circular opening in the lower end thereof, a freely swinging narrow pivoted lug as each side of said opening, each lug having a tapered projection thereon extending into said opening adapted to engage in the groove of a drill disposed in said opening and swinging pivoted means secured to said sleeve for holding the lugs in such engaging position.

In testimony whereof I affix my signature.

FRANK C. SHORE.